United States Patent
Kyriakides et al.

(10) Patent No.: US 8,517,689 B2
(45) Date of Patent: Aug. 27, 2013

(54) MULTI-SEGMENT WIND TURBINE ROTOR BLADE WITH SPAN-WISE OFFSET JOINTS

(75) Inventors: Steven Alan Kyriakides, Simpsonville, SC (US); Scott Gabell Riddell, Greer, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/272,315

(22) Filed: Oct. 13, 2011

(65) Prior Publication Data
US 2012/0141286 A1 Jun. 7, 2012

(51) Int. Cl.
*F01D 5/14* (2006.01)
*F03B 7/00* (2006.01)

(52) U.S. Cl.
USPC .................................................... 416/226

(58) Field of Classification Search
USPC .................. 416/223 R, 225, 226
See application file for complete search history.

(56) References Cited

U.S. PATENT DOCUMENTS

| | | | |
|---|---|---|---|
| 7,334,989 B2 | 2/2008 | Arelt | |
| 7,381,029 B2 | 6/2008 | Moroz | |
| 7,393,184 B2 | 7/2008 | Cairo | |
| 7,922,454 B1 * | 4/2011 | Riddell | 416/224 |
| 2008/0069699 A1 * | 3/2008 | Bech | 416/229 R |
| 2008/0145231 A1 | 6/2008 | Llorente Gonzales et al. | |
| 2009/0155084 A1 * | 6/2009 | Livingston et al. | 416/223 R |
| 2009/0162206 A1 * | 6/2009 | Zirin et al. | 416/223 R |
| 2009/0169323 A1 | 7/2009 | Livingston | |
| 2009/0208341 A1 * | 8/2009 | Llorente Gonzalez et al. | 416/223 R |
| 2010/0132884 A1 * | 6/2010 | Baehmann et al. | 156/293 |
| 2010/0143143 A1 | 6/2010 | Judge | |
| 2011/0142667 A1 * | 6/2011 | Miebach et al. | 416/229 R |
| 2011/0142675 A1 * | 6/2011 | van der Bos | 416/241 R |

OTHER PUBLICATIONS www.wind-energy-the-facts.org/enpart-i-technology/chapter-3-wind-turbine-technology/current-developments, Date of Retrieval: Oct. 12, 2011.

* cited by examiner

*Primary Examiner* — Nathaniel Wiehe
*Assistant Examiner* — Su Htay
(74) *Attorney, Agent, or Firm* — Dority & Manning, PA (57) ABSTRACT

A wind turbine blade includes a first blade segment and a second blade segment, with each of the blade segments having a pressure side shell member, a suction side shell member, and internal support structure. The first and second blade segments have respective adjacent ends with complimentary joint sections that are joinable at a chord-wise joint. Each of the joint sections includes a joint profile that is offset in a span-wise direction from the pressure side shell member to the suction side shell member such that the joint sections are joinable to each other along their respective joint profiles and overlie each other in a span-wise direction.

19 Claims, 6 Drawing Sheets

MULTI-SEGMENT WIND TURBINE ROTOR BLADE WITH SPAN-WISE OFFSET JOINTS

FIELD OF THE INVENTION

The present disclosure relates in general to wind turbine rotor blades, and more particularly to joints for connecting blade segments in wind turbine rotor blades.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known foil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

The size, shape, and weight of rotor blades are factors that contribute to energy efficiencies of wind turbines. An increase in rotor blade size increases the energy production of a wind turbine, while a decrease in weight also furthers the efficiency of a wind turbine. Furthermore, as rotor blade sizes grow, extra attention needs to be given to the structural integrity of the rotor blades. Presently, large commercial wind turbines in existence and in development are capable of generating from about 1.5 to about 12.5 megawatts of power. These larger wind turbines may have rotor blade assemblies larger than 90 meters in diameter. Additionally, advances in rotor blade shape encourage the manufacture of a forward swept-shaped rotor blade having a general arcuate contour from the root to the tip of the blade, providing improved aerodynamics. Accordingly, efforts to increase rotor blade size, decrease rotor blade weight, and increase rotor blade strength, while also improving rotor blade aerodynamics, aid in the continuing growth of wind turbine technology and the adoption of wind energy as an alternative energy source.

As the size of wind turbines increases, particularly the size of the rotor blades, so do the respective costs of manufacturing, transporting, and assembly of the wind turbines. The economic benefits of increased wind turbine sizes must be weighed against these factors. For example, the costs of pre-forming, transporting, and erecting a wind turbine having rotor blades in the range of 90 meters may significantly impact the economic advantage of a larger wind turbine.

One known strategy for reducing the costs of pre-forming, transporting, and erecting wind turbines having rotor blades of increasing sizes is to manufacture the rotor blades in blade segments. The blade segments may be assembled to form the rotor blade after, for example, the individual blade segments are transported to an erection location. However, known joint designs and assembly processes may have a variety of disadvantages. For example, many joint designs require axial insertion of one blade segment into another blade segment, which is time consuming and requires multiple alignment fixtures and motion stops.

Accordingly, there is a need for an improved joint design for segmented wind turbine rotor blades that enables a much simpler assembly with less complicated alignment fixtures and processes.

BRIEF DESCRIPTION OF THE INVENTION

Aspects and advantages of the invention will be set forth in part in the following description, or may be obvious from the description, or may be learned through practice of the invention.

In accordance with aspects of the present subject mater, a wind turbine blade includes a first blade segment and a second blade segment, with each of the blade segments having a pressure side shell member, a suction side shell member, and internal support structure. The first and second blade segments include respective ends with complimentary joint sections that are joinable at a chord-wise joint. Each of the joint sections has a joint profile that extends in an offset span-wise direction from the pressure side shell member to the suction side shell member such that the joint sections overlie each other in a span-wise direction.

In particular embodiments, the offset joint profile is staggered from the pressure side shell member to the suction side shell member and includes at least one joint line that is generally parallel to the pressure side shell member or the suction side shell member in a span-wise direction.

In other embodiments, the first and second blade segments include a leading edge and a trailing edge, and the joint profile includes at least one joint line that is offset chord-wise from the leading edge to the trailing edge. The joint profile may include a plurality of the parallel joint lines and offset chord-wise joint lines.

The staggered joint profile may vary widely within the scope and spirit of the invention. For example, in one embodiment, the internal support structure includes spar caps along the pressure and suction side shell members and the parallel joint lines include an exposed section of one of the spar caps that extends span-wise beyond its respective pressure side or suction side shell member. A section of the opposite one of the suction side or pressure side shell member extends span-wise beyond its respective spar cap along the joint section.

In another embodiment, the internal support structure includes a shear web that spans between the spar caps, with the parallel joint lines including an exposed edge section of the shear web that extends span-wise beyond a respective spar cap at one of the pressure or suction side shell member. A separate parallel joint line includes a section of the opposite spar cap that extends span-wise beyond the shear web at the opposite one of the suction or pressure side shell member.

The joint profile may, in certain embodiments, include an angled face of the shear web that extends span-wise from one spar cap to the opposite spar cap. Alternately, the exposed face of the shear web may define a parallel joint line that extends span-wise along the joint section. In still a further embodiment, the joint profile includes an exposed generally vertical face of the shear web within the joint section.

In still further embodiments, the first and second blade segments include a leading edge and a trailing edge, with the joint profile including at least one joint line that is offset chord-wise from the leading edge to the trailing edge. These joint lines may be defined, for example, at the chord-wise edges of the pressure and suction side shell members of the first and second blade segments. In other embodiments, the internal support structure includes spar caps along the pressure and suction side shell members, with the chord-wise offset joint lines defined at the chord-wise edges of the pressure and suction side shell member spar caps of the respective blade segments.

The present subject matter also encompasses various method embodiments for assembling a wind turbine blade from at least two blade segments, wherein each of the blade segments has a pressure side, a suction side, internal support structure, and respective ends with a joint section. The joint sections have a joint profile that is offset in a span-wise direction from the pressure side shell member to the suction side shell member. The method includes aligning the blade segments in an end-to-end orientation and then moving the joint sections into a mating configuration with relative movement that includes overlapping the respective joint sections of adjacent blade segments. The overlapped joint sections are subsequently moved into engagement with each other and joined along the respective joint profiles at a chord-wise joint such that the joined joint profiles overlie each other in a span-wise direction.

The joint sections may be moved into a mating configuration in various ways. For example, one of the blade segments may be held stationary while the other blade segment is brought into position axially and then lowered onto the stationary blade segment such that the overlapping joint sections engage. The axial movement may be combined with the lowering movement, or the two movements may be done in discrete steps.

The method may include joining the respective joint sections along one or a plurality of joint lines that are generally parallel to the pressure side shell member or suction side shell member in a span-wise direction.

The internal support structure in the blade segments may include spar caps along the pressure and suction side shell members, with the method further including joining the joint sections at parallel joint lines that include an exposed section of one of the spar caps that extends span-wise beyond its respective shell member, and a section of the opposite one of the suction or pressure side shell member that extends span-wise beyond its respective spar cap.

In a further method embodiment, the internal support structure includes a shear web that spans between the spar caps, and the method further includes joining the joint sections at parallel joint lines that include an exposed section of the shear web that extends span-wise beyond a respective spar cap at one of the pressure or suction side shell members, and a section of the opposite spar cap that extends span-wise beyond the shear web at the opposite one of the suction or pressure side shell member. The joint sections may also be joined along an angled face of the shear web that extends span-wise from one spar cap to the opposite spar cap.

Other embodiments may include joining the joint sections along a parallel joint line that includes an exposed section of the shear webs that extend span-wise within the joint section, or along an exposed generally vertical face of the shear webs within the joint section.

Still other method embodiments may include joining the joint sections along at least one section of the respective joint profiles that is also offset chord-wise from a leading edge to a trailing edge of the blade segments. For example, along edges of the pressure and suction side shell members that are offset chord-wise, or along edges of the spar caps that are offset chord-wise.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
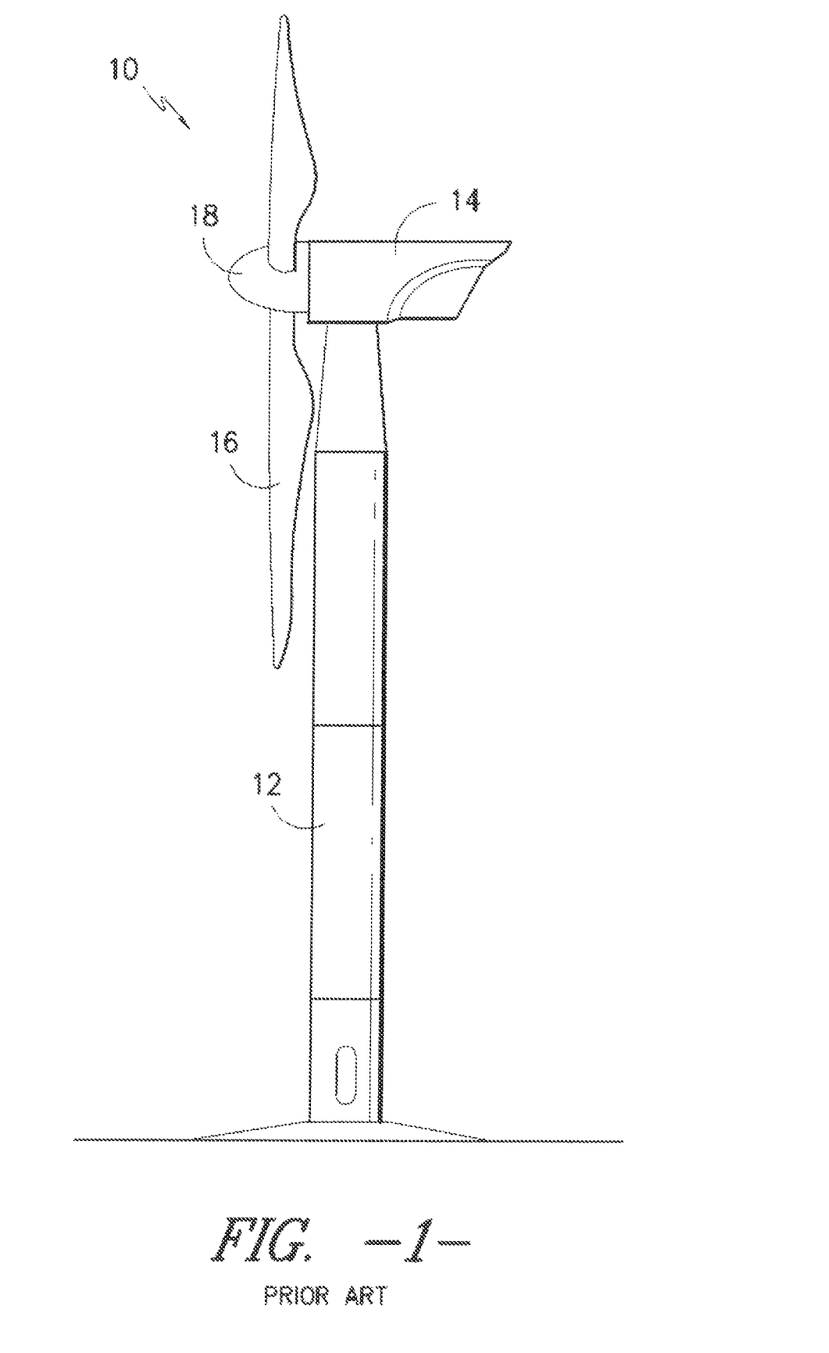
FIG. 1 is a perspective view of an exemplary wind turbine.

FIG. 1 illustrates a wind turbine 10 of conventional construction. The wind turbine 10 includes a tower 12 with a nacelle 14 mounted thereon. A plurality of rotor blades 16 are mounted to a rotor hub 18, which is in turn connected to a main flange that turns a main rotor shaft. The wind turbine power generation and control components are housed within the nacelle 14. The view of FIG. 1 is provided for illustrative purposes only to place the present invention in an exemplary field of use. It should be appreciated that the invention is not limited to any particular type of wind turbine configuration.

Figure 2:
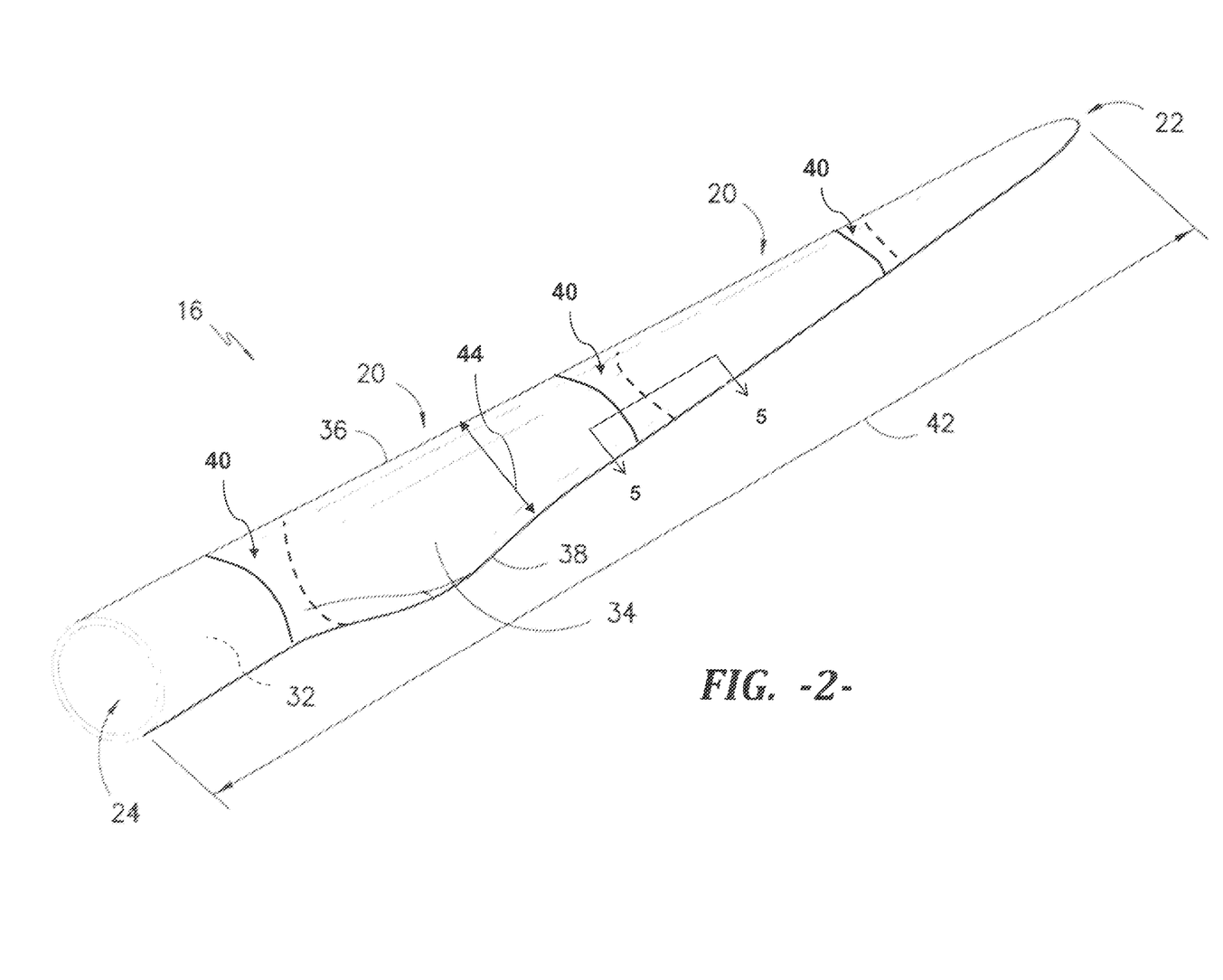
FIG. 2 is a perspective view of a wind turbine rotor blade according to one embodiment of the present disclosure.

Referring to FIG. 2, one embodiment of a rotor blade 16 in accordance with the present disclosure is shown. The rotor blade 16 includes at least two individual blade segments 20 aligned in an end-to-end span-wise order from a blade tip 22 to a blade root 24. A plurality of the blade segments 20 may be provided, as depicted in FIG. 2. Each of the individual blade segments 20 may be uniquely configured so that the plurality of blade segments 20 define a complete rotor blade 16 having a designed aerodynamic profile, length, and other desired characteristics. For example, each of the blade segments 20 may have an aerodynamic contour that corresponds to the aerodynamic contour of adjacent blade segments 20. Thus, the aerodynamic contours of the blade segments 20 may form a continuous aerodynamic contour of the rotor blade 16.

In general, the rotor blade 16, and thus each blade segment 20, includes a pressure side shell member 32 and a suction side shell member 34 extending between a leading edge 36 and a trailing edge 38. Additionally, the rotor blade 16 may have a span 42 and a chord 44. The chord 44 may change throughout the span 42 of the rotor blade 16. Thus, a local chord 46 may be defined at any span-wise location on the rotor blade 16 or any blade segment 20 thereof.

FIGS. 2 through 7 illustrate various embodiments of a chord-wise joint 40 for connecting adjacent blade segments 20 of a rotor blade (FIG. 1), such as first blade segment 58 and second blade segment 64 as shown in the various embodiments. It should be understood that first blade segment 58 and second blade segment 64 may be any suitable adjacent blade segments 20. For example, in some embodiments the first blade segment 58 may extend from the blade tip 22 and second blade segment 54 may extend from blade root 24, or vice-versa. In other embodiments, the first or second blade segments may be intermediate blades segments. The invention is not limited to any number of blade segments within a turbine blade, or number of joints 40.

Figure 3:
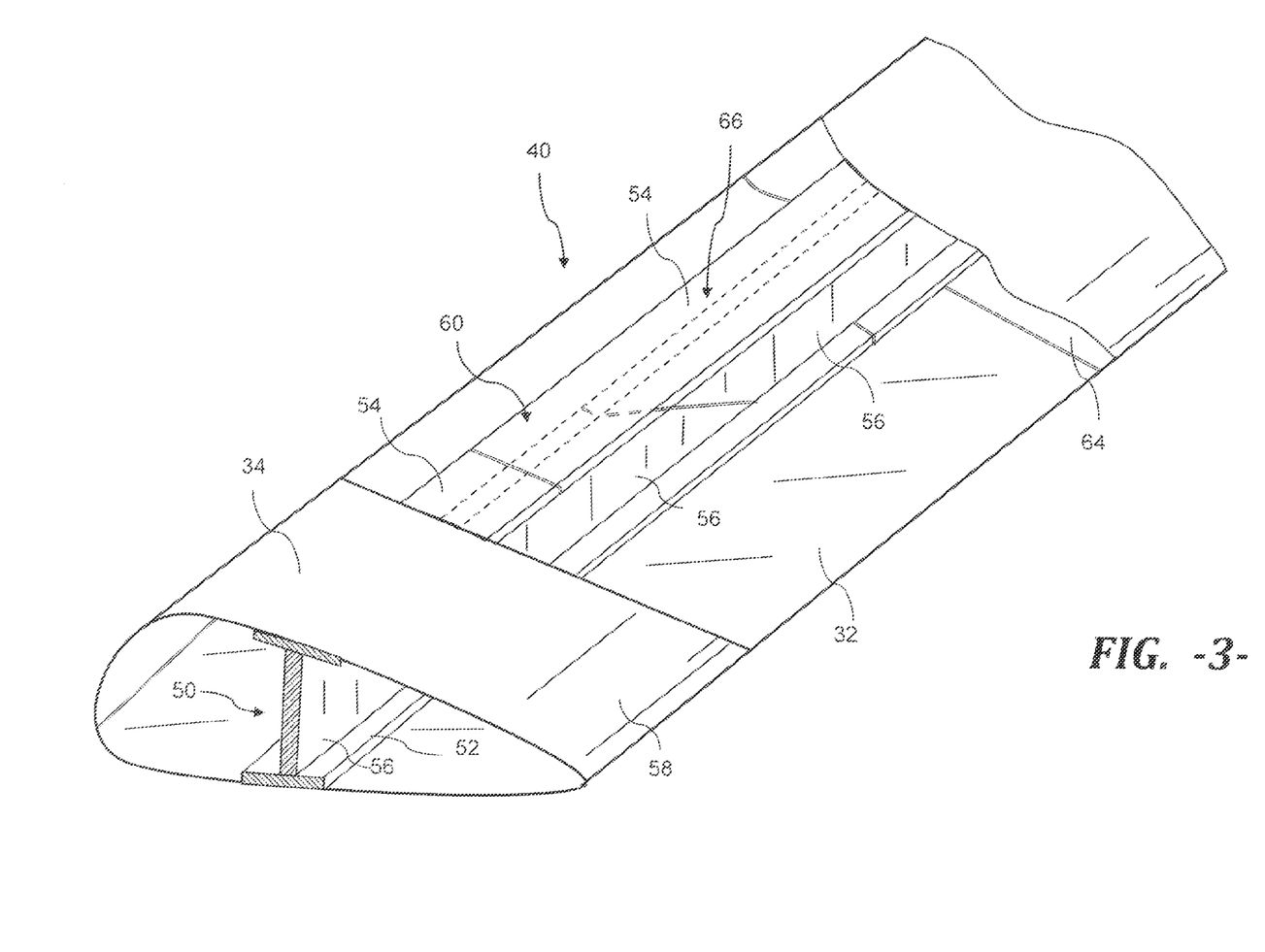
FIG. 3 is a partial cut-away view showing aspects of a joint between adjacent blade segments according to one embodiment of the present disclosure.

FIG. 3 is a partial cutaway view of a joint 40 between adjacent blade segments, namely a first blade segment 58 and a second blade segment 64. A portion of the suction side shell member 34 has been removed from the second blade segment 64 to reveal the underlying staggered joint 40. As is readily appreciated by those skilled in the art, any manner of internal support structure 50 runs span-wise between the shell members 32, 34. In the embodiment depicted in FIG. 3, the internal support structure 50 includes a shear web 56 that spans between a suction side spar cap 54 and a pressure side spar cap 52.

The first 58 and second 64 blade segments include respective adjacent ends having complimentary joint sections 60, 66 that are joined to define the chord-wise joint 40. Each of the joint sections 60, 66 has a span-wise offset joint profile 62, 68 (FIG. 4) that extends in an essentially span-wise direction from the pressure side shell member 32 to the suction side shell member 34 (or vice versa). These span-wise joint sections 60, 66 are defined by the offset length 35 (FIG. 4) in the span-wise direction between the pressure side shell member 32 and suction side shell member 34 shell members for each of the blade segments, as can be readily appreciated from FIGS. 3 and 4. The internal support structure 50 is "exposed" within these span-wise joint sections 60, 66 in that they are not completely encased or encircled by the blade shell members 32, 34 and are thus accessible from a direction that is essentially transverse to the span-wise direction. In this manner, the separate blade segments 58, 64 may be brought together for joining at the joint 40 along a line of movement 70 (FIG. 4) that is generally transverse to the span-wise direction. For example, in certain embodiments, one of the blade segments may be maintained stationary while the other blade segment is essentially lowered onto the stationary blade segment without axial insertion of any component of one blade segment between the suction and pressure side shell members 34, 32 of the other blade segment. The joint sections 60, 66 are essentially brought together in a transverse direction such that the joint profiles 62, 68 essentially overlie each other in a span-wise direction along the mated joint sections 60, 66.

Figure 4:
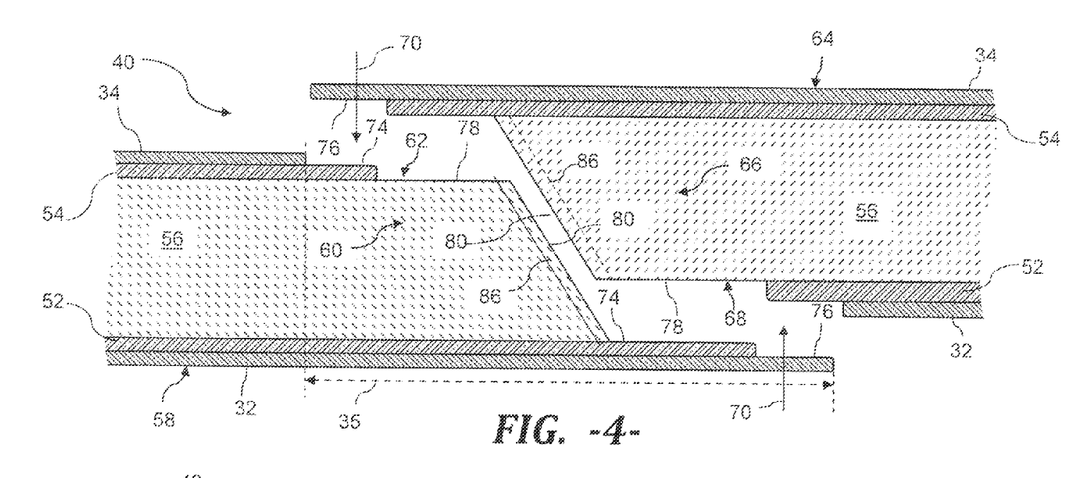
FIG. 4 is a cross-sectional view of an unassembled joint as shown in FIG. 3.

FIG. 4 illustrates certain of the concepts discussed above. A first blade segment 58 is provided with a shear web 56 that spans between a suction side spar cap 54 and a pressure side spar cap 52. An exposed section 74 of the spar cap 54 extends past the suction side shell member 34 in a span-wise direction. Likewise, an exposed edge section 78 of the shear web 56 extend past the spar cap 54 in a span-wise direction. The shear web 56 has a face 80 that extends to the pressure side spar cap 52. In the embodiment of FIG. 4, this face 80 is angled in a span-wise direction. A section 74 of the pressure side spar cap 52 is exposed and extends past the shear web 56 in the span-wise direction. Likewise, a section 76 of the pressure side shell member 32 is exposed and extends past the spar cap 52. It can thus be appreciated that the first blade segment 58 has a joint section 60 that extends in the span-wise direction from the edge of the suction side shell member 34 to the edge of the pressure side shell member 32. Between these edges, a joint profile 62 is defined by the internal support structure members, mainly the spar caps 54, 52 and shear web faces 78, 80. The joint profile 62 may be "staggered" in certain embodiments in that it changes directions in steps as it traverses the various span-wise exposed lengths of the various structural members, as illustrated in FIGS. 3 and 4.

Figure 5:
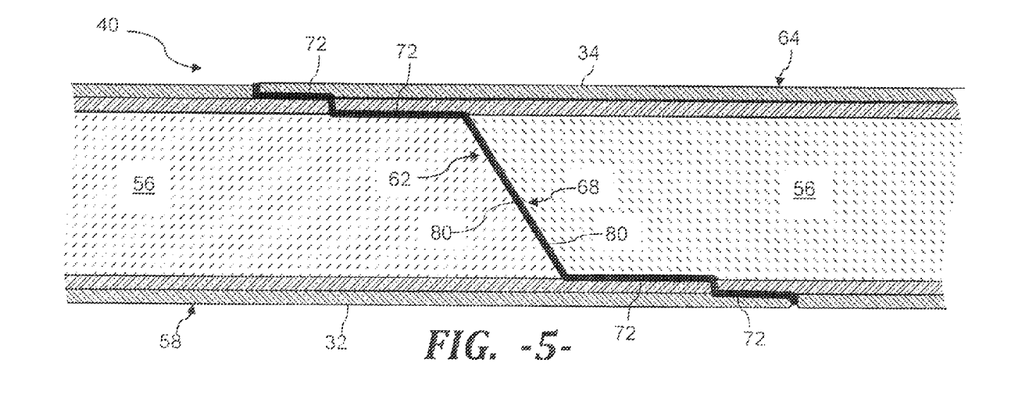
FIG. 5 is a cross-sectional view of the joint of FIG. 4 in an assembled state and taken along the lines indicated in FIG. 2.

Still referring to FIG. 4, it can be readily appreciated that the second blade segment 64 has a complimentary joint section 66 and respective joint profile 68 such that when the segments 58, 64 are brought together in a generally transverse direction as indicated by the arrows 70, the joint profiles 62 and 68 match and engage each other, as depicted in FIG. 5, which illustrates the segments 58, 64 of FIG. 4 in a joined state.

It should be appreciated that the joint profiles 62, 68 may be joined using any suitable joining mechanism or process, including adhesives, bonding material, mechanical fasteners, and any combination of the same. The invention is not limited by the particular type or mechanism for joining the components together along the respective joint profiles 62, 68.

As mentioned, FIG. 5 illustrates the blade segments 58, 64 of FIG. 4 in a joined state. The joint profiles 62, 68 are staggered in this embodiment and define at least one joint line 72 that is generally parallel to the pressure side 32 or suction side 34 shell members. It can be seen from FIG. 5 that four of these generally parallel joint lines 72 are provided in this particular embodiment. The parallel joint lines 72 are defined along the exposed surfaces of the various internal structural members, for example, one of the parallel joint lines is defined between the suction side shell member 34 of the second blade segment 64 and the suction side spar cap 54 of the first blade segment 58. A second generally parallel joint line 72 is defined between the same components on the suction side of the blade segments. Additional generally parallel joint lines 72 are defined between the exposed edges 78 (FIG. 4) of the shear web 56 and the exposed faces of the spar caps 74 (FIG. 4).

FIG. 5 depicts the joint 40 of FIG. 4 in a joined state. The angled shear web faces 80 of the respective joint profiles 62, 68 define an angled (span-wise) joint line.

It should be readily appreciated that any manner of engaging profile may be defined between the mating edges or surfaces of the various structural components that define the joint 40. For example, referring to FIG. 4, chamfered surfaces 86 may be defined on the opposed faces 80 of the shear web. Any other type of inter-engaging structure may be defined on any of the other surfaces as well. For example, any manner of male/female engaging structure, alignment structure, or the like, may be provided on any of the mating surfaces to provide for a more secure alignment and interface between the components.

Figure 6:
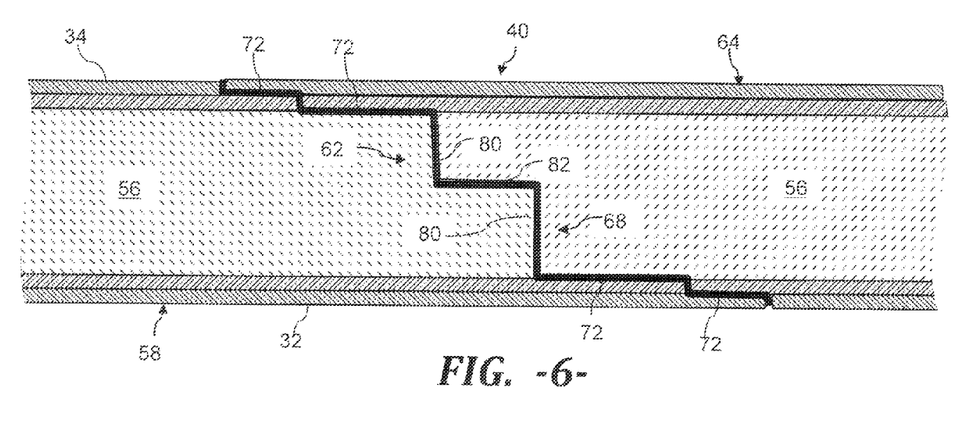
FIG. 6 is a cross-sectional view of an alternative embodiment of a joint according to another embodiment of the present disclosure.

FIG. 6 illustrates an embodiment that is similar to FIG. 5 with the exception that the exposed shear web faces 80 have a staggered profile that includes an additional parallel joint line 82 between generally vertical legs of the respective shear web faces 80. It should also be appreciated that, in an additional embodiment, the intermediate joint line 82 may be disposed at an span-wise angle, and need not be parallel to the pressure or suction side shell members 32, 34.

Figure 7:
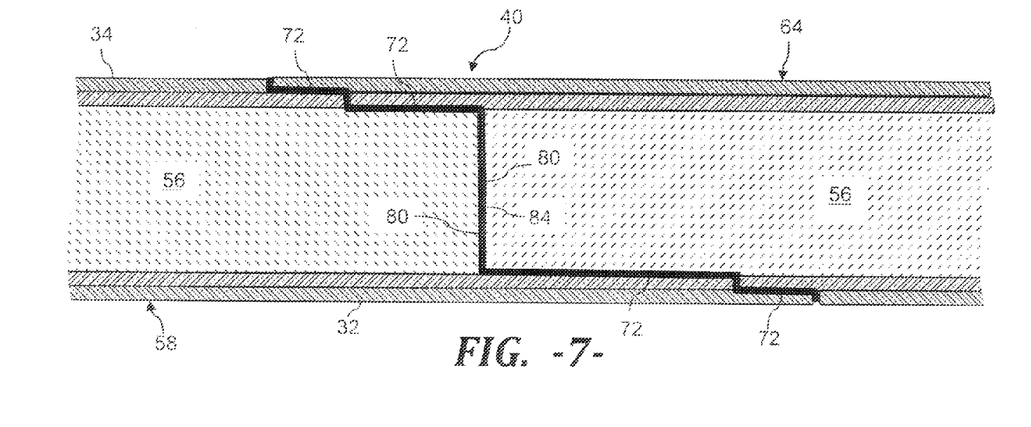
FIG. 7 is a cross-sectional view of still a different embodiment of a joint design.

The embodiment of FIG. 7 is similar to the embodiment of FIG. 6 with the exception that the exposed face sections 80 of the respective shear webs 56 are defined as generally vertical faces that span between the spar caps to define an essentially vertical shear web bond line 84.

Figure 8:
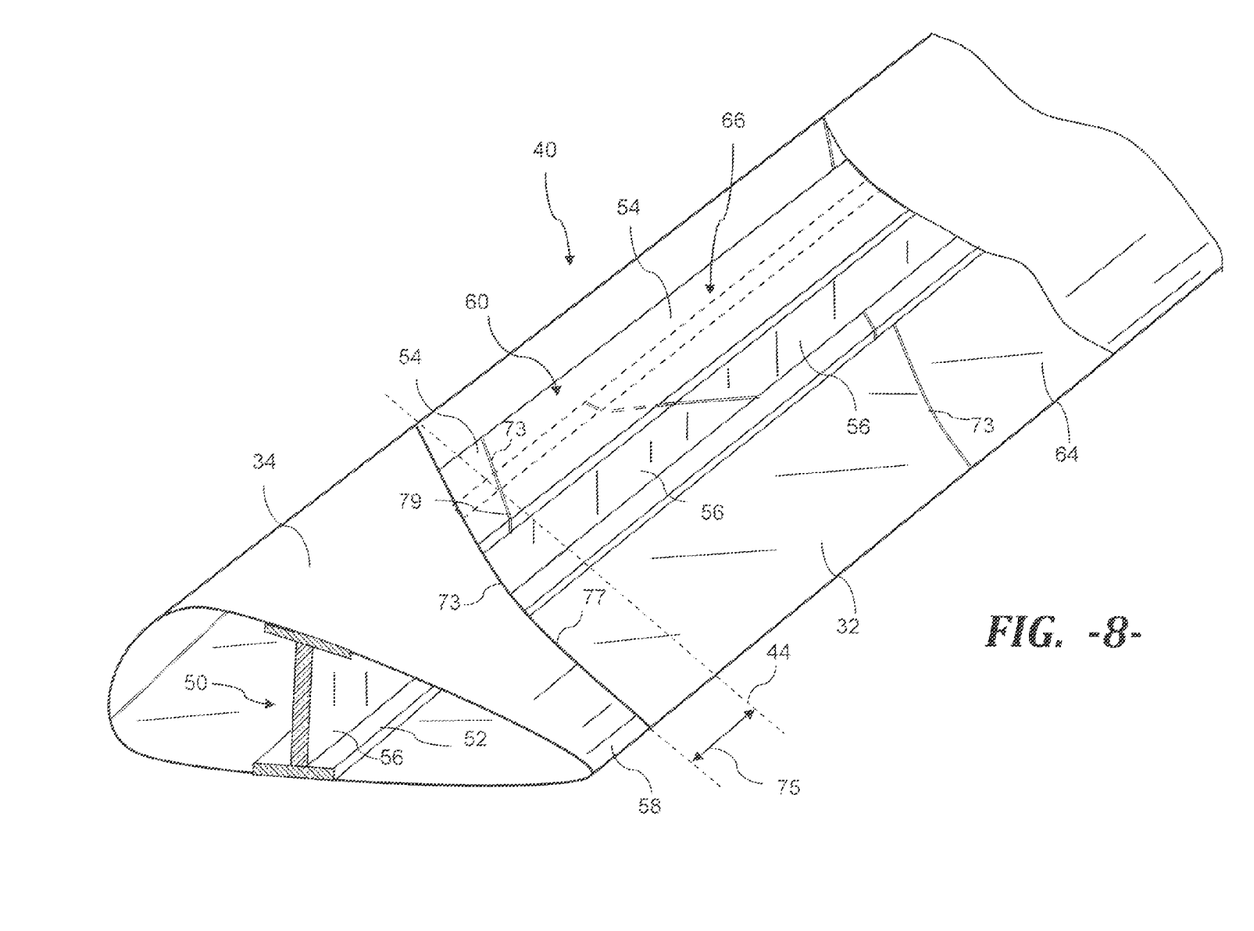
FIG. 8 is a partial cut-away view showing aspects of a joint between adjacent blade segments according to another embodiment of the present disclosure.

The view of FIG. 8 is similar to FIG. 3 and depicts an embodiment of a joint 40 wherein the staggered joint profiles 62, 68 of the respective joint sections 60, 66 also incorporate a chord-wise offset aspect along one or more joint line sections 73. In these sections 73, the joint is not oriented in a true chord axis from the leading edge 36 to the trailing edge 38, but is angled or offset from the chord axis by an amount 75 between the edges 36, 38, as depicted in FIG. 8. For example, the joint line sections 73 along the edges 77 of the pressure side shell members 32 and suction side shell members 34 of adjacent blade segments 58, 66 is offset chord-wise by the amount 75. Likewise, the joint line sections 73 along the edges 79 of the spar caps 54 of adjacent segments 58, 66 and along the spar caps 52 of adjacent segments 58, 66 have an offset chord-wise aspect.

The present invention also encompasses various method embodiments for assembling a wind turbine blade 16 from at least two blade segments 58, 64, wherein each of the blade segments has a pressure side shell member 32 and a suction side shell member 34, as well as any manner of internal support structure, including spar caps 52, 54 and a shear web 56 that spans between the spar caps. Referring to FIGS. 4 and 5, the method includes positioning the blade segments 58, 64 such that the respective joint sections 60, 66 of the blade segments are generally aligned in an end-to-end orientation for subsequent joining of the joint sections. The blade segments are moved such that the span-wise offset joint sections 60, 66 overlie each other. The overlapped (span-wise) joint sections are then brought into a mating engagement with each other and subsequently joined along the joint sections by any suitable joining means. This is accomplished with any combination of relative movement between the blade segments. For example, in one of the method embodiments, the blade segments may first be brought into a span-wise alignment by a pure axial movement, with one of the blade segments spaced above the other such that joint sections overlap in the span-wise direction. One of the blade segments may be held stationary in this process. The aligned overlapped joint sections may then be brought into engagement by lowering one of the blade segments onto the other.

In an alternate method embodiment, the process of moving the blades segments into axial alignment and lowering one blade segment onto the other may be accomplished in the same continuous movement.

The various method embodiments may include joining the respective joint sections along at least one joint line that is generally parallel to either of the pressure or suction side shell members in a span-wise direction. The respective joint sections may be joined along a plurality of these parallel joint lines that define interfaces between various exposed surfaces of the different internal support members within the respective joint sections.

As discussed above, the internal support structure may include spar caps along the pressure and suction side shell members, wherein the method includes joining the joint sections at parallel joint lines that include exposed sections of a spar cap that extend span-wise beyond its respective pressure or suction side shell member at each of the pressure and suction sides of the blade. Likewise, the method may include joining the joint sections at parallel joint lines that include exposed edge sections of the shear web that extend span-wise beyond respective spar caps at the pressure and suction sides of the blade.

As discussed above with respect to FIG. 8, the method may include joining the joint sections along at least one section of the respective joint profiles that is also offset chord-wise from a leading edge to a trailing edge of the blade segments. For example, certain embodiments may include joining the joint sections along edges of the pressure and suction side shell members that are offset chord-wise, or along joint sections along edges of the spar caps that are offset chord-wise.

Various combinations of method embodiments may include joining the joint profiles within the respective joint sections along any of the surfaces as discussed above.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A wind turbine blade, comprising:
a first blade segment and a second blade segment, each of said blade segments having a pressure side shell member, a suction side shell member, and internal support structure;
said first and second blade segments comprising respective adjacent ends having complimentary joint sections that are joinable at a chord-wise joint;
each of said joint sections comprising a span-wise offset joint profile that extends in a single span-wise direction from said pressure side shell member to said suction side shell member such that said respective joint profiles overlie each other in a span-wise direction without axial insertion of one of said blade segments into the other said blade segment;
wherein each said joint profile is staggered from said pressure side shell member to said suction side shell member and includes at least one joint line that is generally parallel to said pressure side shell member or said suction side shell member in a span-wise direction; and
wherein each said joint profile comprises a plurality of said parallel joint lines, said internal support structure within each said blade segment comprising spar caps along said pressure and suction side shell members, a first one of said parallel joint lines within each said blade segment including an exposed section of one of said spar caps that extends span-wise beyond its respective pressure or suction side shell member, and a second one of said parallel joint lines in the same said blade segment including a section of the opposite said suction or pressure side shell member that extends span-wise beyond the opposite respective said spar cap.

2. The wind turbine blade of claim 1, wherein said internal support structure of each of said blade segments comprises a shear web that extends between said pressure and suction side shell members, said joint profile of each of said blade segments including an angled face of said shear web that extends span-wise between said pressure and suction side shell members.

3. The wind turbine blade of claim 2, wherein said face of said shear web of each of said blade segments further comprises a joint line that is generally parallel to said pressure side shell member or said suction side shell member in a span-wise direction.

4. The wind turbine blade of claim 1, wherein said internal support structure of each of said blade segments comprises a shear web that extends between said pressure and suction side shell members, each said joint profile including an exposed generally vertical face of said shear web within said joint section.

5. The wind turbine blade of claim 4, wherein said vertical face comprises a chamfered surface.

6. The wind turbine blade of claim 1, wherein said first and second blade segments include a leading edge and a trailing edge, each said joint profile comprising at least one joint line that is offset chord-wise from said leading edge to said trailing edge.

7. The wind turbine blade of claim 6, wherein said chord-wise offset joint lines are defined along chord-wise edges of said pressure and suction side shell members of said first and second blade segments.

8. The wind turbine blade of claim 6, wherein said chord-wise offset joint lines are defined along chord-wise edges of said spar caps.

9. The wind turbine blade of claim 6, wherein said chord-wise offset joint lines are defined along chord-wise edges of said spar caps and along chord-wise edges of said pressure and suction side shell members of said first and second blade segments.

10. A wind turbine blade, comprising:
a first blade segment and a second blade segment, each of said blade segments having a pressure side shell member, a suction side shell member, and internal support structure;
said first and second blade segments comprising respective adjacent ends having complimentary joint sections that are joinable at a chord-wise joint;
each of said joint sections comprising a span-wise offset joint profile that extends in a single span-wise direction from said pressure side shell member to said suction side shell member such that said respective joint profiles overlie each other in a span-wise direction without axial insertion of one of said blade segments into the other said blade segment;
wherein each said joint profile is staggered from said pressure side shell member to said suction side shell member and includes at least one joint line that is generally parallel to said pressure side shell member or said suction side shell member in a span-wise direction; and
wherein each said joint profile comprises a plurality of said parallel joint lines, said internal support structure within each said blade segment comprising spar caps along said pressure and suction side shell members and a shear web that spans between said spar caps, a first one of said parallel joint lines within each said blade segment including an exposed section of said shear web that extends span-wise beyond a respective said spar cap at one of said pressure or suction side shell members, and a second one of said parallel joint lines in the same said blade segment including a section of the opposite said spar cap that extends span-wise beyond said shear web at the opposite one of said suction or pressure side shell member.

11. The wind turbine blade of claim 10, wherein said joint profile of each of said blade segments includes an angled face of said shear web that extends span-wise between said pressure and suction side shell members.

12. The wind turbine blade of claim 11, wherein said face of said shear web of each of said blade segments further comprises a joint line that is generally parallel to said pressure side shell member or said suction side shell member in a span-wise direction.

13. The wind turbine blade of claim 10, wherein each said joint profile includes an exposed generally vertical face of said shear web within said joint section.

14. The wind turbine blade of claim 13 wherein said vertical face comprises a chamfered surface.

15. The wind turbine blade of claim 10, wherein said first and second blade segments include a leading edge and a trailing edge, each said joint profile comprising at least one joint line that is offset chord-wise from said leading edge to said trailing edge.

16. The wind turbine blade of claim 15, wherein each said joint profile comprises a plurality of said chord-wise offset joint lines.

17. The wind turbine blade of claim 15, wherein said chord-wise offset joint lines are defined along chord-wise edges of said pressure and suction side shell members of said first and second blade segments.

18. The wind turbine blade of claim 15, wherein said chord-wise offset joint lines are defined along chord-wise edges of said spar caps.

19. The wind turbine blade of claim 15, wherein chord-wise offset joint lines are defined along chord-wise edges of said spar caps and along chord-wise edges of said pressure and suction side shell members of said first and second blade segments.

* * * * *